United States Patent
Keller (10) Patent No.: US 8,121,180 B1
(45) Date of Patent: Feb. 21, 2012

(54) AUTOMATIC OUTPUT DRIVE LEVEL CONTROL IN HOME NETWORKING TRANSCEIVER

(75) Inventor: Philip Keller, Fremont, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 797 days.

(21) Appl. No.: 09/413,821

(22) Filed: Oct. 7, 1999

(51) Int. Cl.
  *H04B 1/38* (2006.01)
  *H04B 3/00* (2006.01)
  *H04L 25/03* (2006.01)

(52) U.S. Cl. .......................... 375/219; 375/296; 375/257

(58) Field of Classification Search .................. 375/219, 375/257, 295–297, 222, 312, 317, 319, 376, 375/326, 220, 258; 370/282; 379/1.03, 1.04, 379/80.01, 98.05, 93.06, 93.07, 93.08, 93.37, 379/93.01, 90.01; 327/3, 2, 50, 63, 307, 327/104, 108, 58, 60, 66, 72, 77–79, 62; 326/81, 33
See application file for complete search history.

(56) References Cited

U.S. PATENT DOCUMENTS

| | | | | |
|---|---|---|---|---|
| 3,686,634 A * | 8/1972 | Malchman et al. | ....... | 340/171 R |
| 3,958,082 A | 5/1976 | Huellwegen | ..................... | 178/58 |
| 4,682,050 A * | 7/1987 | Beranger et al. | ................ | 326/26 |
| 5,041,745 A * | 8/1991 | Raso | ............................. | 307/520 |
| 5,463,329 A * | 10/1995 | Kawasaki et al. | ................ | 326/77 |
| 5,467,369 A * | 11/1995 | Vijeh et al. | ..................... | 375/224 |
| 5,539,771 A * | 7/1996 | Noda et al. | ..................... | 375/219 |
| 5,581,197 A * | 12/1996 | Motley et al. | .................... | 326/30 |
| 5,867,097 A * | 2/1999 | Jung et al. | ...................... | 340/531 |
| 5,890,057 A * | 3/1999 | Dutkiewicz et al. | ............ | 455/69 |
| 5,917,344 A * | 6/1999 | Wilhelm | ........................ | 326/126 |
| 6,208,094 B1 * | 3/2001 | Morrish | ........................ | 315/813 |
| 6,229,466 B1 * | 5/2001 | Gattani | ......................... | 341/120 |
| 6,272,325 B1 * | 8/2001 | Wiedeman et al. | ........... | 455/117 |
| 6,292,015 B1 * | 9/2001 | Ooishi et al. | .................... | 326/33 |
| 6,377,666 B1 * | 4/2002 | Cheng et al. | ................. | 379/93.06 |
| 6,397,287 B1 * | 5/2002 | Brown et al. | ................. | 710/305 |
| 6,408,032 B1 * | 6/2002 | Lye et al. | ...................... | 375/257 |
| 6,424,630 B1 * | 7/2002 | Ang | .............................. | 370/251 |
| 6,504,634 B1 * | 1/2003 | Chan et al. | ..................... | 359/159 |
| 6,507,223 B2 * | 1/2003 | Felder | ............................ | 327/77 |
| 6,526,581 B1 * | 2/2003 | Edson | ............................. | 725/74 |
| 6,580,905 B1 * | 6/2003 | Naidu et al. | ................... | 455/522 |
| 6,615,301 B1 * | 9/2003 | Lee et al. | ....................... | 710/106 |
| 6,711,138 B1 * | 3/2004 | Pai et al. | ........................ | 370/257 |
| 6,748,078 B1 * | 6/2004 | Posthuma | ..................... | 379/413 |

FOREIGN PATENT DOCUMENTS

GB        2 094 105 A  *  1/1981

* cited by examiner

*Primary Examiner* — Tesfaldet Bocure
(74) *Attorney, Agent, or Firm* — Ditthavong Mori & Steiner, P.C.

(57) ABSTRACT

A novel method of configuring a transceiver for data transmission via residential wiring. The method involves setting a DC level at the output terminal of the transceiver, comparing a value representing the DC level with a predetermined threshold level, and controlling an output driver of the transceiver until this value is equal to the threshold level. The output driver may be controlled during initialization of the transceiver. To implement the method, the transceiver is provided with an output drive control system for comparing a DC level set at the output terminal with the threshold signal to control the output driver so as to maintain the transmit signal at a prescribed level.

16 Claims, 6 Drawing Sheets

AUTOMATIC OUTPUT DRIVE LEVEL CONTROL IN HOME NETWORKING TRANSCEIVER

FIELD OF THE INVENTION

The present invention relates to network interfacing, and more particularly, to an automatic output drive level control system in a home networking transceiver for data communications over existing residential telephone line wiring.

BACKGROUND ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home telephone wire network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard Plain Old Telephone System (POTS) telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of transmit data from the received pulse becomes substantially difficult.

Devices that support communications in the home telephone wire network environment must meet requirements established by the Home Phoneline Networking Alliance (HPNA). Such requirements are disclosed in the HPNA Specification 1.0 released in 1998. For example, the 1.0 Specification imposes restrictions on the output characteristics of a home networking transceiver.

Moreover, parameters of output drive circuitry in the home networking transceiver vary from chip to chip and from run to run. These parameter variations result in changes of the output drive level of the home networking transceiver. Therefore, it would be desirable to provide a home networking transceiver with an automatic output drive level control system.

DISCLOSURE OF THE INVENTION

The present invention provides a novel method of configuring a transceiver having an output driver for driving an output terminal to provide data transmission via residential wiring. The method involves setting a DC level at the output terminal, comparing a value representing the DC level with a predetermined threshold level, and controlling the output driver of the transceiver until this value is equal to the threshold level. For example, the output driver may be controlled during initialization of the transceiver.

In accordance with a preferred embodiment, the output driver may be controlled for high and low power output levels to set corresponding output drive levels in accordance with the HPNA specification.

The method may be implemented in a transceiver for providing data communications over residential wiring, having an output driver for supplying a transmit signal at a prescribed level to the residential wiring, and an output drive control system for comparing a DC level set at the output of the output driver with a predetermined threshold signal to control the output driver so as to maintain the transmit signal at the prescribed level.

The output drive control system may comprise a comparator circuit for comparing a controlled signal representing the DC level set at the output with the threshold signal. A drive control circuit may be responsive to the comparator circuit for controlling the output driver until the controlled signal is equal to the threshold signal.

Also, the output drive control system may comprise a multiplexer that supplies the controlled signal representing the DC level to the comparator circuit in an output drive level control mode of operation carried out, for example, during initialization of the transceiver. During a normal mode of operation, this multiplexer may connect the input circuitry of the transceiver to the comparator circuit.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Figure 1:
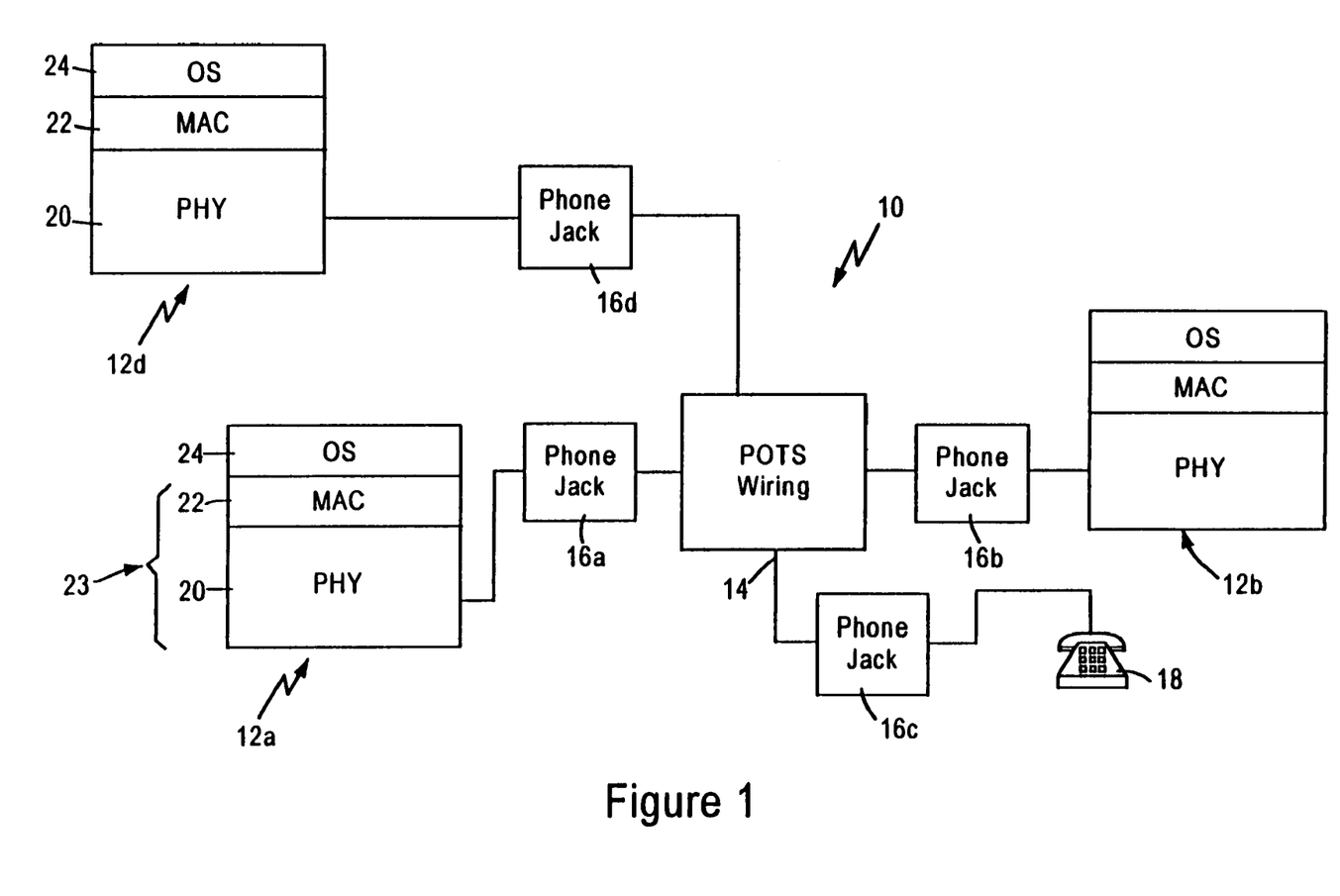
FIG. 1 is a block diagram illustrating a local area network deployed over residential twisted pair wiring.

FIG. 1 is a diagram of a home telephone wire network 10 according to an embodiment of the invention, using existing residential wiring such as twisted pair telephone line wiring as network media. As shown in FIG. 1, the network 10 supporting the Ethernet (IEEE 802.3) standard includes network stations 12a and 12b that are connected to a twisted pair telephone line wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model. For example, a home networking transceiver complying with the HPNA Specification 1.0 may be used as the PHY transceiver 20.

Figure 2A:
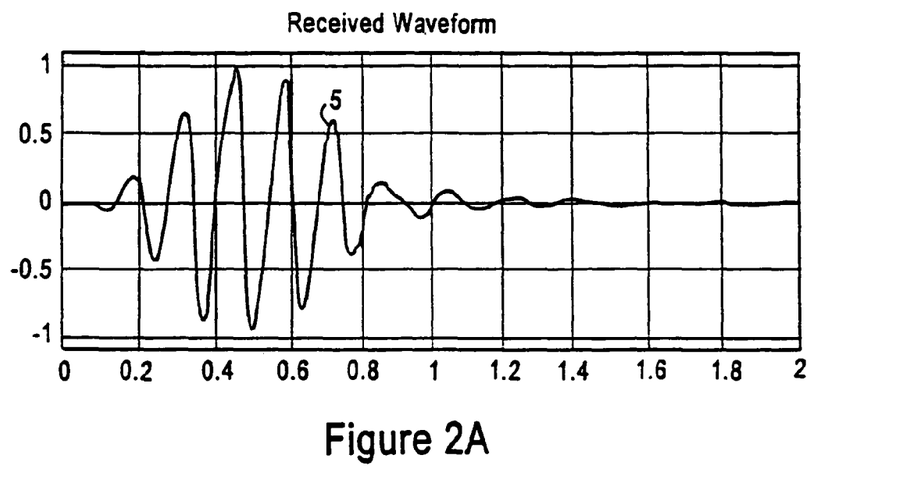
FIGS. 2A, 2B, 2C and 2D are diagrams illustrating processing of received waveforms by the physical layer transceiver of FIG. 1 according to an embodiment of the present invention.
Figure 2B:
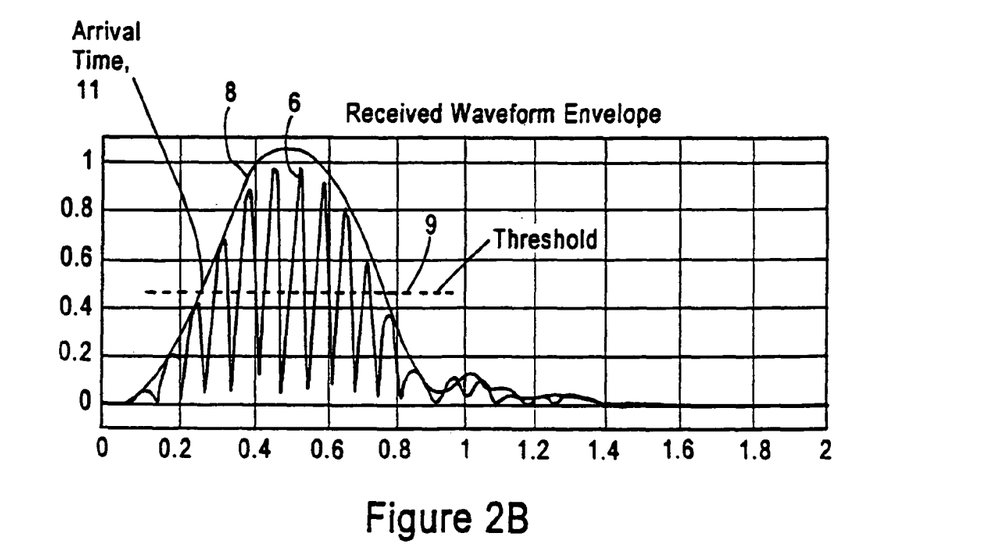

The stations 12a and 12b communicate by transmitting band-limited pulses that carry network data modulated in the analog network signals. In particular, the physical layer transmitter transmits a band-limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
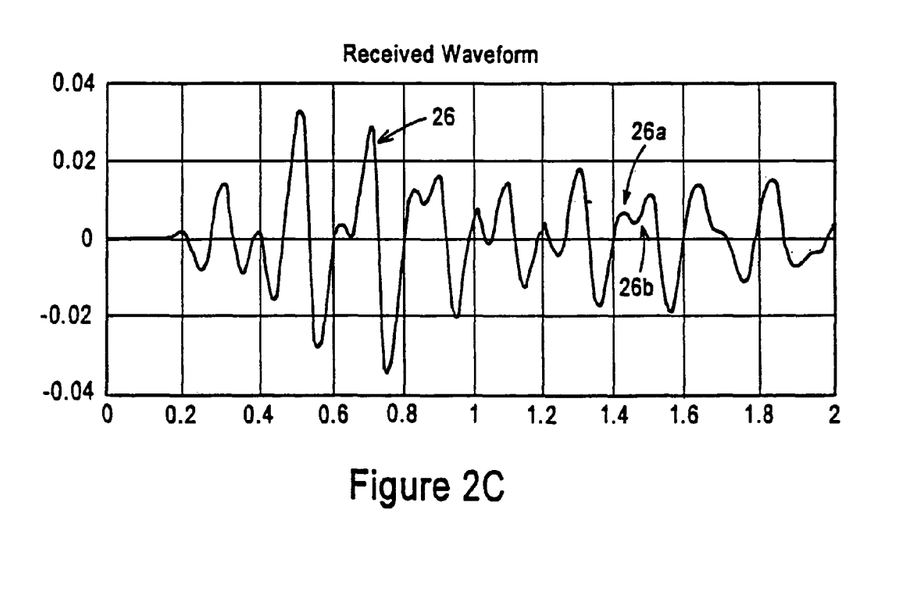
Figure 2D:
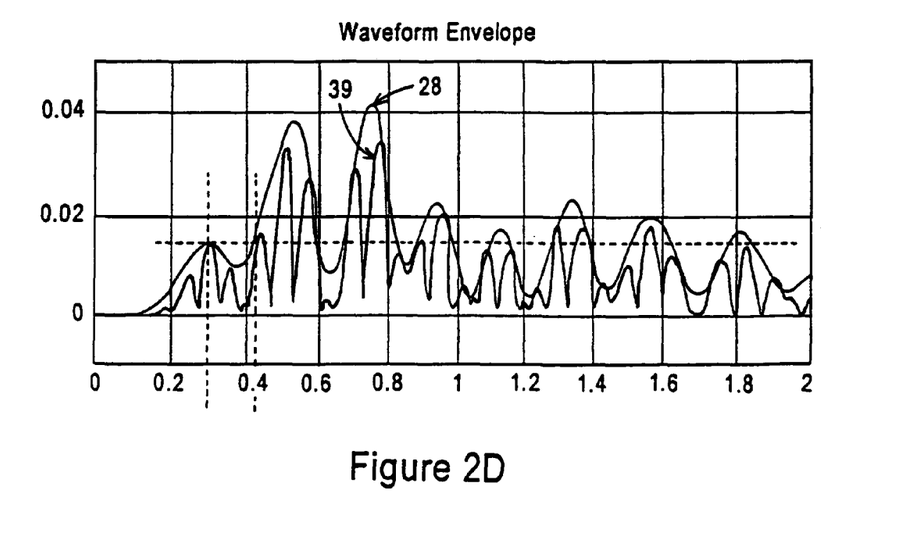

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26.

Figure 3:
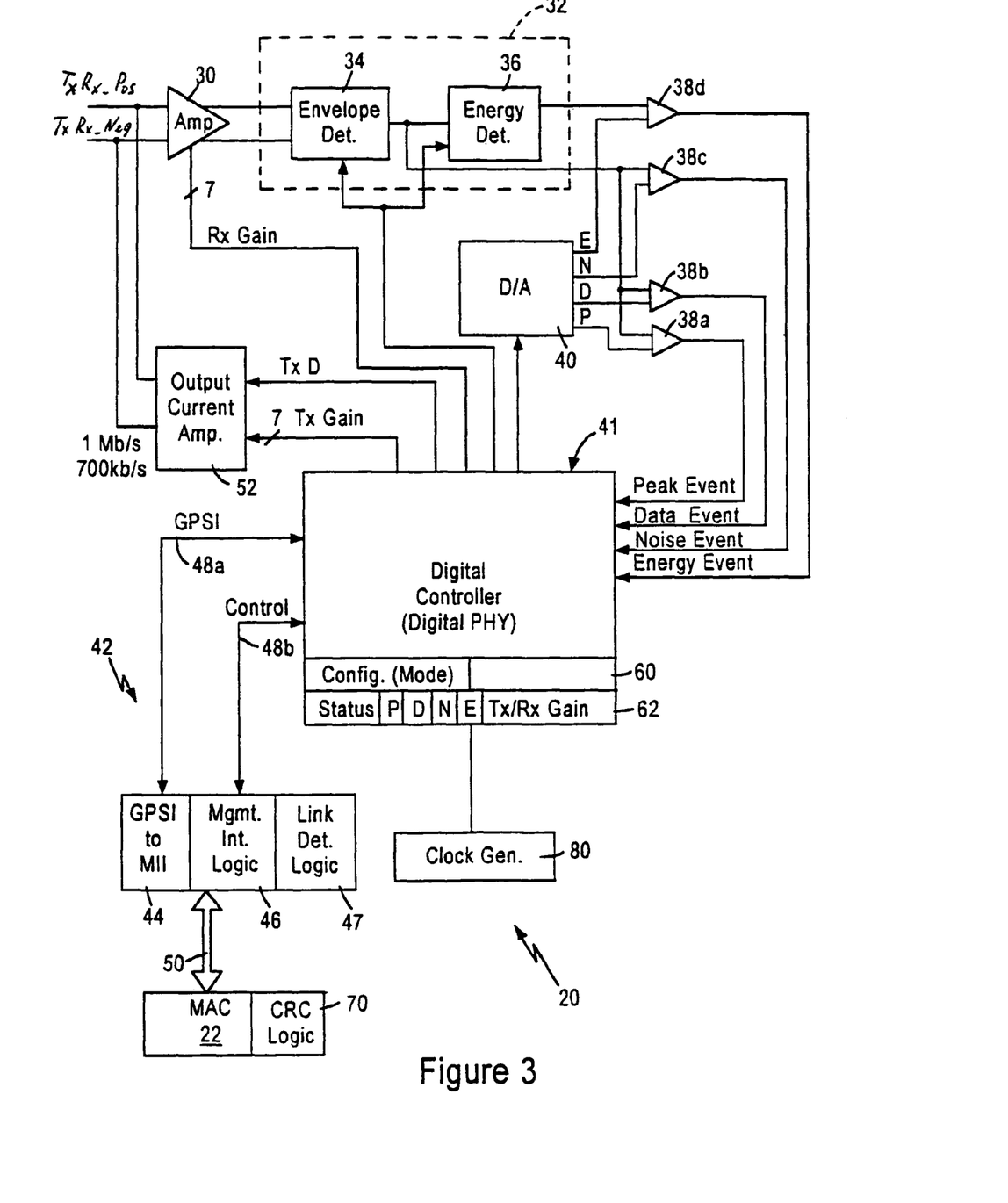
FIG. 3 is a block diagram illustrating the architecture of the physical layer transceiver of FIG. 1 according an embodiment of the present invention.

FIG. 3 is a block diagram of the physical layer transceiver 20 according to an embodiment of the present invention. As shown in FIG. 3, the physical layer transceiver 20 includes an input amplifier 30 connected to complementary input/output terminals TxRx_Pos and TxRx_Neg for amplifying analog network signals received from the telephone medium, such as the network signals shown in FIG. 2C. The physical layer transceiver 20 also includes a signal conditioning circuit 32 that includes an envelope detection circuit 34 and an energy detection circuit 36. The envelope detection circuit 34 is responsive to the amplified received signal 26 to generate the envelope signal 28. For example, the envelope detector 34 includes an absolute value circuit (e.g., a rectifier circuit) that generates an absolute value signal 39 representing the absolute value of the amplified received signal 26, and a low pass filter coupled to the rectifier circuit for filtering out high-frequency components of the rectified signal, resulting in the envelope signal 28. The envelope signal 28 is output from the envelope detector 34 and supplied to the energy detector 36. The energy detector 36 includes an integrator that performs the mathematical process of integration of the envelope signal 28 over time to produce a signal proportional to energy of the received pulse signal.

As shown in FIG. 3, the physical layer transceiver 20 also includes slicer circuits 38a, 38b, 38c and 38d, and a digital to analog (D/A) converter 40 for supplying analog threshold signals to the slicer circuits 38. The physical layer transceiver 20 also includes a digital controller 41 configured for controlling the digital analog converter 40 to output threshold signals supplied to the slicer circuits 38.

The digital controller 41 is configured for controlling the threshold values applied to the slicers 38a, 38b, 38c and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N), respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating, with respect to time whether the envelope signal 28 exceeds a peak threshold (P), a data transition threshold (D), and a noise threshold (N), respectively. Slicer 38d outputs an energy event signal indicating with respect to time whether the energy signal from the energy detector 36 exceeds an energy threshold (E).

The digital controller 41 controls the noise, peak, data transition and energy thresholds based on the noise event signals and the peak event signals output by the slicers 38c and 38a, respectively, and produces a digital data signal based on the arrival position of the received pulse detected using either the energy event signal or the data event signal. The digital data signal is output to the media access controller 22 via a media independent interface (MII) 50.

The physical layer transceiver 20 also includes an output driver 52 (e.g., a current amplifier), that converts transmit data (TxD) produced by the digital controller 41 to an analog network signal supplied via the complementary input/output terminals TxRx_Pos and TxRx_Neg. The analog network signal is output at a selected one of 128 output gain values based on a 7-bit transmit gain (TxGain) signal output by the digital controller 41.

Further, the physical layer transceiver 20 comprises an output interface 42 including a Media-Independent Interface (MII) to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48*a*.

The output interface 42 also includes a control data bus 48*b* for transferring configuration data and status information between the digital converter 41 and the management interface logic 46. In particular, the management interface logic 46 is configured for storing at selected control registers 60 configuration data received from the MAC 22 via the MII 50 into the digital controller 41. Note that the threshold value E for the energy detector slicer circuit 38*d* may be supplied by the management agent via the MII 50 and set in the configuration registers 60. The digital controller 41 also comprises status registers 62 that include, for example, the threshold values for the threshold signals P, D, and E, and the 7-bit output amplifier gain control signal TxGain.

The output interface 42 also includes link detection logic 47 for determining whether a valid link is detected on the network medium 14. If no valid access identification (AID) sequence is detected within three successive detection intervals, each having a preferred duration of about 800 milliseconds, the link status is sent to an invalid state. AID replaces the preamble conventionally used in 10 Base-T Ethernet (IEEE 802.3) systems. AID is a specific identifier, which is unique for each network station 12. For example, AID may be a series of 8 pulses output from the PHY transceiver 20 of the transmitting station onto the telephone medium 14, where the time intervals between the first pulse and the successive 7 pulses define respective values. For instance, assume a second pulse is output by the PHY transceiver 20 following a first pulse after time interval T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values representing time intervals T2, T3, T4, T5, T6 and T7 between the first pulse and each of the 6 pulses following the second pulse. Hence, the presence of the valid AID can be determined by detecting a first pulse, and detecting a presence of 7 successive pulses using detection windows having predetermined duration, for example, 128 clock cycles.

Figure 4:
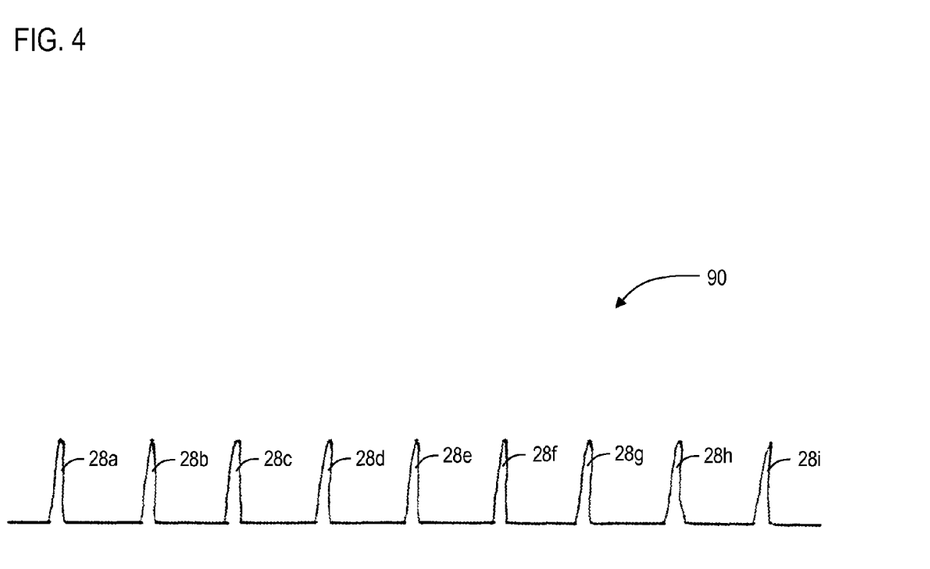
FIG. 4 is a diagram illustrating the access identification interval of the present invention.

As shown in FIG. 4 that illustrates a sequence of envelope pulses 28 used to define an AID interval 90, eight AID envelope pulses 28*a*, 28*b*, 28*c*, 28*d*, 28*e*, 28*f*, 28*g* and 28*h* are inserted before the data packet, which begins with the envelope pulse 28*i* contiguously following the last AID envelope pulse 28*h*. As described above, the envelope pulses 28 are generated by the envelope detector 34 in response to received network signals 5.

Due to process variations, the output characteristics of the physical layer transceiver 20, such as the output drive level, substantially vary from run to run. To correct any deviation of the output drive level from a proper level, the physical layer transceiver 20 of the present invention comprises an automatic output drive level control system 100 schematically shown in FIG. 5. The system 100 compares a level at the output of the transceiver 20 with a preset threshold level to produce a level control signal used to control the output level of the output driver 52.

Figure 5:
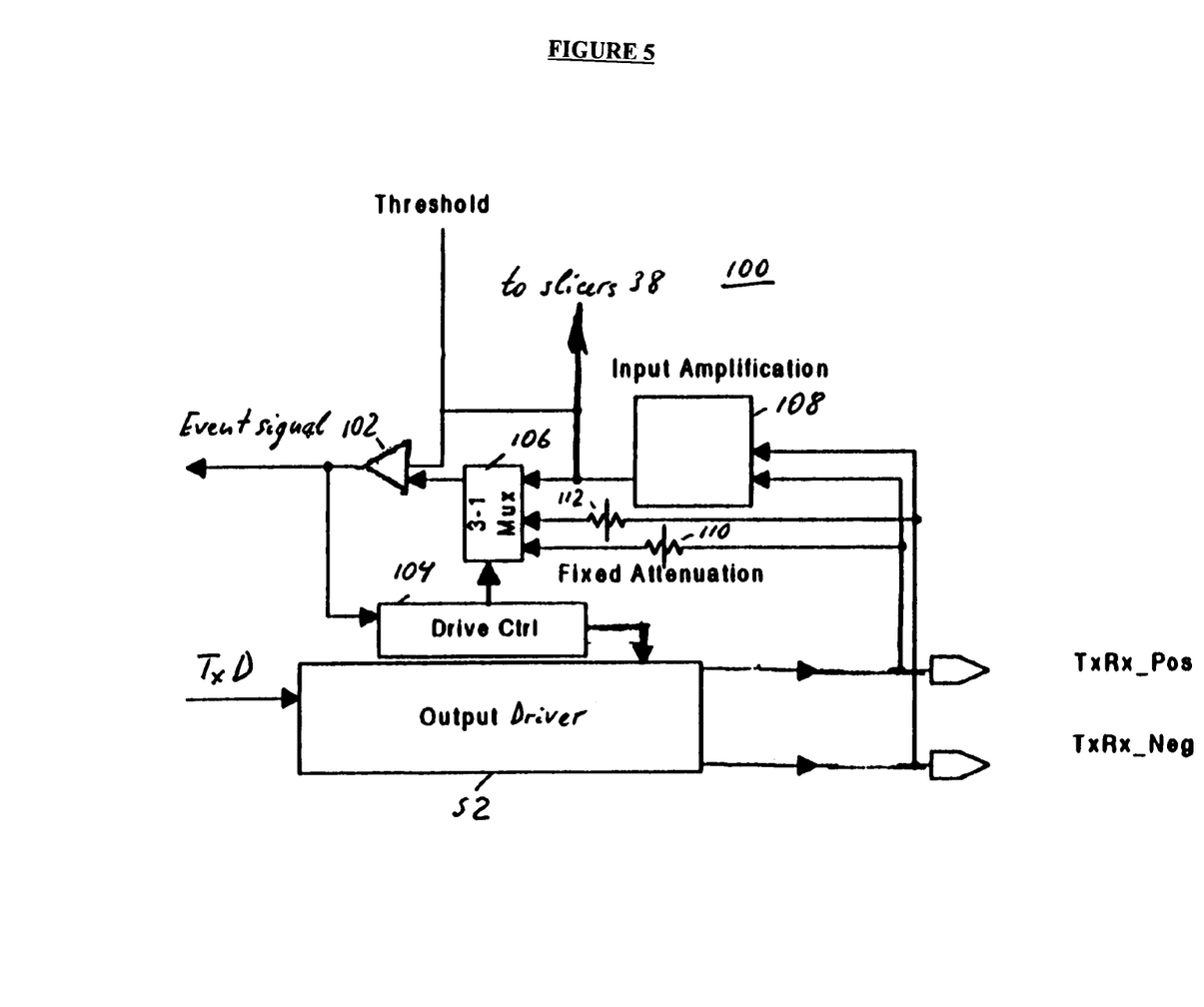
FIG. 5 is a block diagram illustrating an automatic output drive control arrangement of the present invention.

For example, the automatic output drive level control system 100 may separately control output drive levels at the complementary input/output terminals TxRx_Pos and TxRx_Neg of the physical layer transceiver 20. During normal operations, the terminals TxRx_Pos and TxRx_Neg supply complementary analog network signals transmitted to other network stations 12. In an output drive level control mode of operation, e.g. during or immediately after a reset operation, the automatic output drive level control system 100 uses DC levels set at the terminals TxRx_Pos and TxRx_Neg to adjust the output drive level of the transceiver 20 to a proper value, such as the output drive voltage required by the HPNA specification 1.0.

The automatic output drive level control system 100 comprises a comparator circuit 102 for comparing DC levels set at the terminals TxRx_Pos and TxRx_Neg with a preset threshold level to produce a level control signal supplied to a drive control circuit 104 for controlling the output driver 52. For example, the digital controller 41 may act as the drive control circuit 104.

The controlled input of the comparator circuit 102 is connected to the output of a multiplexer 106 having a first input connected to the terminal TxRx_Pos, a second input coupled to the terminal TxRx_Neg, and a third input coupled to input amplification circuitry 108 of the transceiver 20. For example, the third input of the comparator circuit 102 may be connected to the output of the envelope detector 34. The slicer 38*a*, 38*b* or 38*c* may be used as the comparator circuit 102. Fixed attenuators 110 and 112 may be respectively connected between the terminals TxRx_Pos and TxRx_Neg and the corresponding inputs of the multiplexer 106. For example, the attenuators 110 and 112 may provide attenuation with a ratio of 6.

During normal operations of the transceiver 20, the multiplexer 106 supplies the output of the input amplification circuitry 108 to the comparator circuit 102 for producing a peak event, data event, or noise event signal, depending on whether the slicer 38*a*, 38*b* or 38*c* is used as the comparator circuit 102. However, in an output drive level control mode of operation, e.g. during or immediately after a RESET operation, the drive control circuit 104 controls the multiplexer 106 to pass a signal representing a DC level set at the terminal TxRx_Pos to the controlled input of the comparator circuit 102.

The comparator circuit 102 compares the signal at its controlled input with a threshold level and produces a level control signal representing the difference between the compared signals. The level control signal is supplied to the drive control circuit 104 that controls the output driver 52 so as to reduce the level at the TxRx_Pos terminal if the signal at the controlled input of the comparator 102 is higher than the threshold level, or to increase the level at the TxRx_Pos terminal if the signal at the controlled input of the comparator 102 is lower than the threshold level.

The control procedure continues until the signal at the controlled input of the comparator 102 becomes equal to the threshold level. For example, the drive control circuit 104 may increase or decrease the value of the gain control signal TxGain supplied to the output driver 52 until the signal at the controlled input of the comparator 102 is equal to the threshold level.

After the proper drive level is established at the terminal TxRx_Pos, the multiplexer 106 is controlled to pass a signal representing a DC level set at the terminal TxRx_Neg to the controlled input of the comparator 102. The drive control circuit 104 controls the output driver 52 until the signal at the controlled input becomes equal to the threshold level.

In a preferred embodiment of the invention, the output drive level is adjusted for high and low power levels of the transciever 20. For example, an output drive level control procedure may begin with setting a desired high power output level at the terminal TxRx_Pos or TxRx_Neg. The high power output level set at the corresponding terminal TxRx- _Pos or TxRx_Neg may be a DC level, e.g. 2 V, corresponding to a high level of a sinusoidal transmit signal defined in the HPNA Specification 1.0.

Via the attenuator 110 or 112, the DC level is supplied to the controlled input of the comparator 102 for comparing with the threshold level. In response to the level control signal produced by the comparator 102, the drive control circuit 104 adjusts the output drive level until the level at the controlled input becomes equal to the threshold level. Then, the output drive level at the corresponding terminal TxRx_Pos or TxRx_Neg may be adjusted for a desired low power output level. The low power output level set at the corresponding terminal TxRx_Pos or TxRx_Neg may be a DC level, e.g. 1 V, corresponding to a low level of the sinusoidal transmit signal defined in the HPNA Specification 1.0. The threshold value is selected to provide the output drive level required by the HPNA Specification 1.0. As discussed above, the output drive level control procedure may be carried out for each of the terminals TxRx_Pos and TxRx_Neg.

Those skilled in the art will recognize that the present invention admits of a number of modifications, within the spirit and scope of the inventive concepts. For example, the output drive control procedure may be implemented in a number of different ways.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of configuring a transceiver having an output driver for driving an output terminal to provide data transmission via residential twisted pair wiring, the method comprising the steps of:
    setting a DC level at the output terminal for supplying a transmit signal of a prescribed level to the residential twisted pair wiring,
    comparing a controlled value representing the DC level with a predetermined threshold level, and
    controlling the output driver until the controlled value is equal to the threshold level.

2. The method of claim 1, wherein the output driver is controlled during initialization of the transceiver.

3. The method of claim 1, wherein the output driver is controlled for a high power level and a low power level set at the output terminal.

4. The method of claim 1, wherein the output driver is controlled to establish an output drive level required by the HPNA specification.

5. A transceiver for providing data communications over residential twisted pair wiring, comprising:
    an output driver having an output for supplying a transmit signal of a prescribed level to the residential twisted pair wiring, and
    an output drive control system for comparing a DC level set at the output of the output driver with a predetermined threshold signal to control the output driver so as to maintain the transmit signal at the prescribed level.

6. The transceiver of claim 5, wherein the output drive control system comprises a comparator circuit for comparing a controlled signal representing the DC level set at the output with the threshold signal.

7. The transceiver of claim 6, wherein the output drive control system further comprises a drive control circuit responsive to the comparator circuit for controlling the output driver until the controlled signal is equal to the threshold signal.

8. The transceiver of claim 7 further comprising input circuitry for receiving an incoming signal from the residential wiring.

9. The transceiver of claim 8, wherein the output drive control system further comprises a multiplexer for connecting the input circuitry to the comparator circuit during a normal mode of operation, and for supplying the controlled signal representing the DC level during an output drive level control mode of operation.

10. The transceiver of claim 9, wherein the output drive level control mode of operation is carried out during initialization of the transceiver.

11. The transceiver of claim 5, wherein the output drive control system comprises a comparator for comparing the DC level set at the output of the output driver with the predetermined threshold signal, the comparator being responsive to an incoming signal from the residential twisted pair wiring during a normal mode of operation.

12. The transceiver of claim 11, wherein the comparator is responsive to the DC level during an output driver control mode of operation carried out to correct a deviation at an output of the output driver from a proper level.

13. A method of configuring a transceiver having an output driver for driving an output terminal to provide data transmission via residential twisted pair wiring, the method comprising the steps of:
    setting a DC level at the output terminal for supplying a transmit signal of a prescribed level to the residential twisted pair wiring,
    comparing a controlled value representing the DC level with a predetermined threshold level, and
    controlling the output driver until the controlled value is equal to the threshold level, wherein the step of comparing is carried out by a comparator responsive to an incoming signal from the residential twisted pair wiring during a normal mode of operation.

14. The method of claim 13, wherein the comparator is responsive to the controlled value during an output driver control mode of operation carried out to correct a deviation at an output of the output driver from a proper level.

15. The method of claim 13, wherein the output driver is controlled during initialization of the transceiver.

16. The method of claim 13, wherein the output driver is controlled for a high power level and a low power level set at the output terminal.

* * * * *